United States Patent [19]

Geary

[11] Patent Number: 4,707,078
[45] Date of Patent: Nov. 17, 1987

[54] FERROELECTRIC LIQUID CRYSTAL DEVICES USING FIELD-STABILIZED STATES

[75] Inventor: John M. Geary, Scotch Plains, N.J.

[73] Assignee: American Telephone and Telegraph Company, AT&T Bell Laboratories, Murray Hill, N.J.

[21] Appl. No.: 727,690

[22] Filed: Apr. 26, 1985

[51] Int. Cl.[4] .................. G02F 1/133; G02F 1/18
[52] U.S. Cl. .................... 350/332; 350/340; 350/350 S
[58] Field of Search .................. 350/330–338, 350/340, 341, 346, 349, 350

[56] References Cited

U.S. PATENT DOCUMENTS

| 3,936,815 | 2/1976 | Kogure et al. | 350/346 X |
| 4,030,997 | 6/1977 | Miller et al. | 350/340 X |
| 4,221,471 | 9/1980 | Gurtler | 350/331 R |
| 4,367,924 | 1/1983 | Clark et al. | 350/334 |
| 4,370,194 | 1/1983 | Shaver et al. | 350/334 X |
| 4,427,979 | 1/1984 | Clerc et al. | 350/332 X |

FOREIGN PATENT DOCUMENTS 93426  5/1984  Japan .................. 350/330

OTHER PUBLICATIONS

"Some Novel Ferroelectric Smectic Liquid Crystals," in *Liquid Crystals and Ordered Fluids*, ed. A. C. Griffin et al., Plenum Publishing Company, 1984, pp. 1–32, J. W. Goodby et al.
"The Ferroelectric Phases Derived from the 4-n-Alkoxycinnamic Acids," *Ferroelectrics*, vol. 58, (1984), pp. 9–20, T. M. Leslie.
"Ferroelectric Liquid Crystals—Structure and Design," *Mol. Cryst. Liq. Cryst.*, vol. 110, (1984), pp. 175–203, J. W. Goodby et al.
"Submicrosecond Bistable Electro-optic Switching in Liquid Crystals," *Applied Physics Letters*, vol. 36 (Jun. 1980), pp. 899–901, N. A. Clark et al.
"Molecular Tilt in the Smectic C Phase: A Zigzag Model," *Annals de Physique*, vol. 3 (1978), pp. 389–396, R. Bartolino et al.
"A Reliable Method of Alignment for Smectic Liquid Crystals," *Ferroelectrics*, vol. 59 (1984), pp. 137–144, J. S. Patel et al.

*Primary Examiner*—Donald A. Griffin
*Attorney, Agent, or Firm*—Michael J. Urbano

[57] ABSTRACT

In a display device utilizing ferroelectric (e.g., chiral, smectic C material), a stabilizing electric field perpendicular to the cell surfaces forces the molecules to orient themselves in one of two states both of which are parallel to the cell surfaces. A particular state is selected by a switching electric field also oriented perpendicular to the cell surfaces. The stabilizing field has a half-cycle time shorter than the switching time of the ferroelectric material, whereas the switching field duration is longer than or equal to the switching time of the material. The invention enables the use of relatively thick (e.g., $\geq 2$ $\mu m$) ferroelectric cells.

18 Claims, 8 Drawing Figures

FERROELECTRIC LIQUID CRYSTAL DEVICES USING FIELD-STABILIZED STATES

CROSS-REFERENCE TO RELATED APPLICATIONS

This application was concurrently filed with two of my commonly assigned applications: J. M. Geary et al Case 8-4-4, Ser. No. 727,572 entitled "Liquid Crystal Devices" (now U.S. Pat. No. 4,615,586 and J. M. Geary, Ser. No. 727,573 entitled "Alignment Technique For Liquid Crystal Devices" (now U.S. Pat. No. 4,664,480.

BACKGROUND OF THE INVENTION

This invention relates to liquid crystal devices and, more particularly, to such devices utilizing ferroelectric liquid crystal (LC) materials. Although the following description relates primarily to liquid crystal displays (LCDs), the primary intended application, the invention also contemplates use in other applications such as optical shutters.

A display device utilizing ferroelectric, chiral, smectic C materials has been suggested by N. A. Clark et al, Applied Physics Letters Vol. 36, p. 899 (1980). In this device, the smectic material is layered, and the layers are aligned perpendicular to the glass surfaces of the cell as shown in FIG. 1. The liquid crystal molecules lie flat on the surfaces and are restricted at the surfaces to only two positions (i.e., states $S_1$ and $S_2$) out of the cone of possible orientations (FIG. 2) that the chiral, smectic C state allows. The surfaces of the cell are closely spaced (about 1 μm separation) so that the bulk of the sample follows the molecular orientation at the surface, thereby creating the two "surface-stabilized states" identified by Clark et al, supra. The influence of the surfaces also helps to suppress the helix of the chiral smectic C material so that the two states are not disrupted by pitch bands. The ferroelectric fixed dipole moment ($M_1,M_2$), which is inherent at the chiral center, points normal to the surfaces, up in one state ($S_1$) and down in the other ($S_2$). Hence, the device can be switched between the two states with a pulsed electric field applied via electrodes on the surface. The influence of the closely spaced surfaces causes the switched state to latch so that the state is maintained after the pulse is over. Thus, the device is bistable in that a latched state is maintained for time which is longer than the time between adjacent write and erase pulses or between adjacent refresh pulses, whichever is greater. Appropriately oriented polarizers are used to produce a visible contrast between the two states.

Fabrication of the above display may present difficulties owing to the required close (about 1 μm) spacing of the cell surfaces. A ferroelectric display with a larger cell spacing in the range of 5 μm to 10 μm, as used in presently manufactured twisted nematic LCDs, would be desirable. However, when such larger spacings are used with conventional ferroelectric LC materials, a pitch band texture forms which renders the device less desirable. Even if the pitch bands are eliminated, the desired two-state behavior is not observed in thick cells (i.e., cells ≧2 μm thick). Instead, at the end of the switching pulse, the material quickly reverts to a complex twisted state akin to the intermediate state sometimes seen in thin ferroelectric cells. In these twisted states, the molecular orientation varies around the smectic C cone as one goes from one cell surface to the other. What is needed in thick cells is a means for holding the molecular orientation in the bulk of the cell to those two orientations allowed close to the cell surfaces.

SUMMARY OF THE INVENTION

In accordance with my invention, the negative dielectric anisotropy of ferroelectric LCs is exploited to induce bulk two-state behavior. More specifically, an electric field applied perpendicular to the cell surfaces acts on a LC molecule with negative dielectric anisotropy so as to orient the core axis of the molecule normal to the electric field and thus parallel to the cell surfaces. The core axis is the x-ray axis as defined by R. Bartolino et al in *Annals de Physique*, Vol. 3, p. 389 (1978). In a smectic C phase LC material, for example, the cone of possible molecular orientations allows just two such states, which are identical to the two homogeneous surface-induced orientations. However, for a ferroelectric LC, the field will also act on the fixed dipole moment of the molecules and thus tend to favor one of the two states. In accordance with one aspect of my invention, this effect is circumvented by using a stabilizing electric field which has a half cycle time substantially shorter than the time for the LC material to switch from one stable state to another, hereinafter termed the "switching" time. The stabilizing field preferably has a substantially zero average over the duration of the switching pulse discussed below (e.g., the stabilizing field is generated by an AC voltage signal such as a sinusoid). Thus, the influence of such a field on the fixed dipole moment will also average out to zero. But, since the effect of an electric field on dielectric anisotropy is independent of the sign of the field, the stabilizing field will still act to orient the core axis of the molecules perpendicular to the field lines, and thus tend to restrict them to the two states that are parallel to the cell surfaces. This effect acts throughout the bulk of the cell, thus producing field-stabilized states even in thick samples. In accordance with another aspect of my invention, these states are switched by superimposing a switching electric field on the stabilizing field. The duration of the switching field, which is illustratively generated by a pulsed voltage signal, should be substantially longer than or equal to the switching time of the LC material. Since all the molecular orientations between these states are not perpendicular to the field, they are energetically disadvntageous and create a threshold potential between the two states.

LC devices in accordance with my invention show latching and sharp switching thresholds as well as improved contrast and switching speed for field-stabilized states. Of these characteristics, the enhanced switching speed is particularly advantageous in matrix addressing schemes for LCDs, and the improved contrast is especially useful in optical shutters.

BRIEF DESCRIPTION OF THE DRAWING

My invention, together with its various features and advantages, can be readily understood from the following more detailed description taken in conjunction with the accompanying drawing, in which.

DETAILED DESCRIPTION

Figure 1:
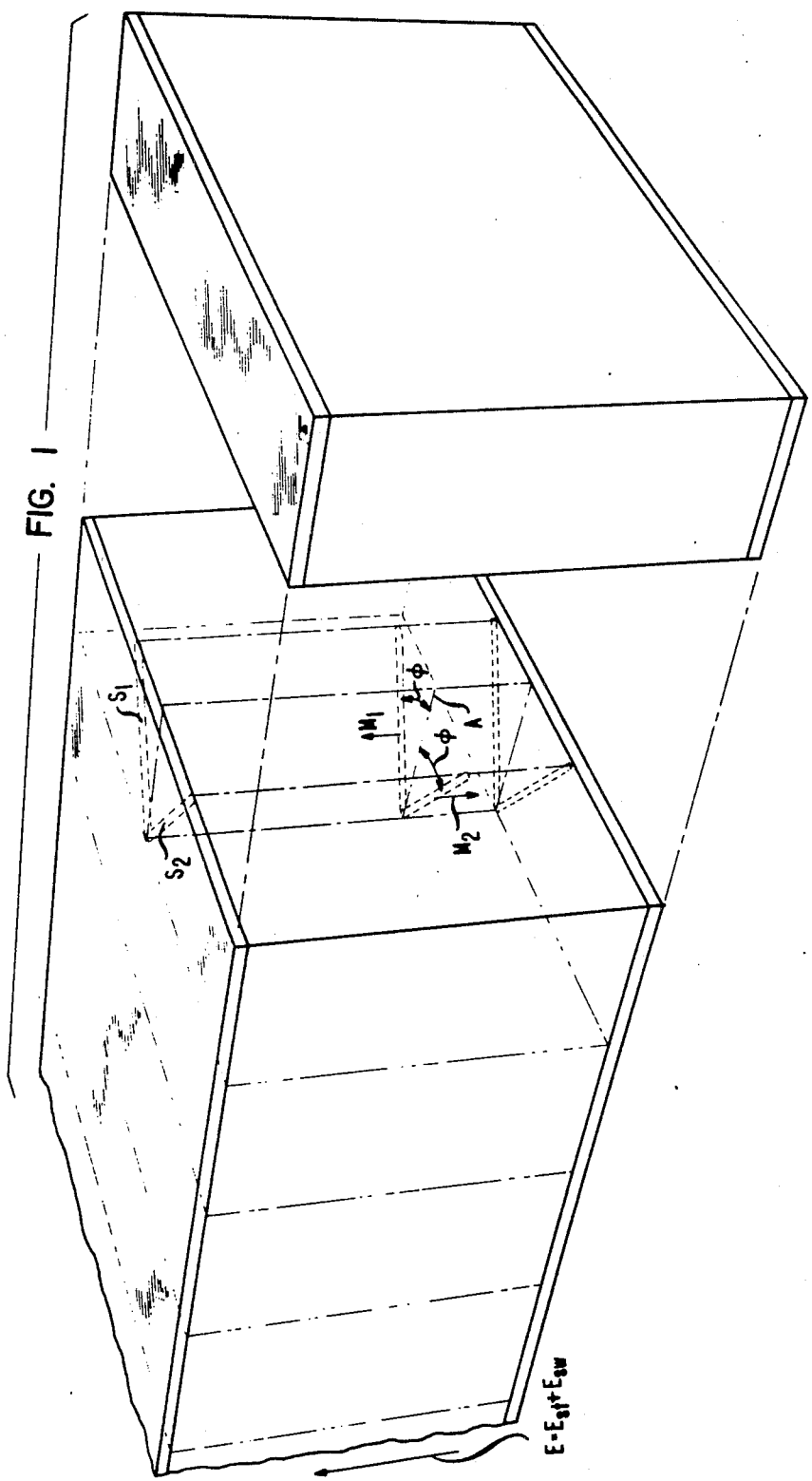
FIG. 1 is a schematic, isometric view of a LC cell showing the field-stabilized states in accordance with one aspect of my invention.
Figure 2:
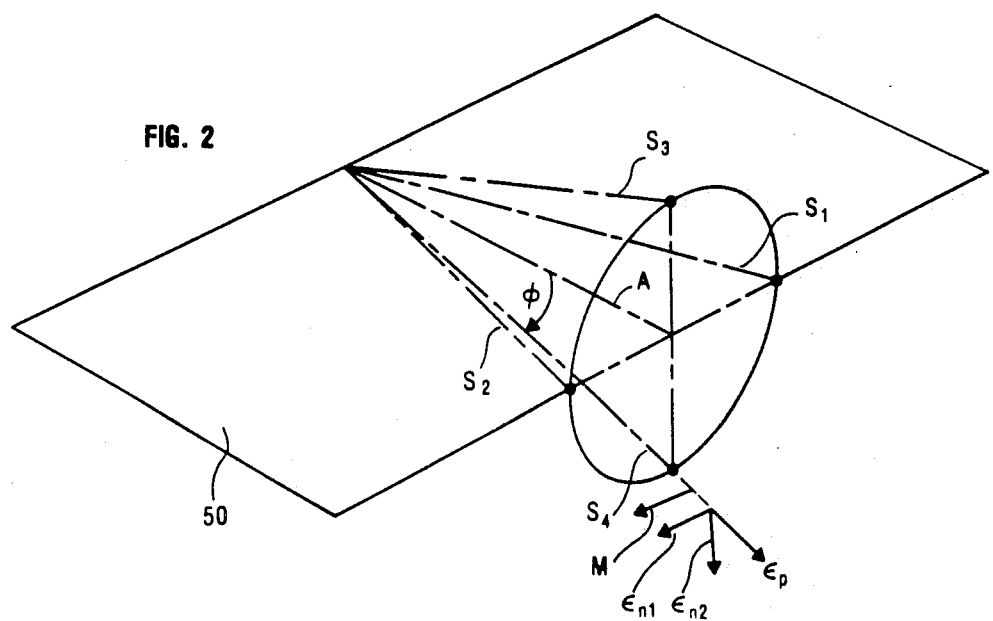
FIG. 2 shows the cone of possible orientations of the molecules of a ferroelectric, smectic C material.

The operation of the stabilizing field in producing bistable states, and the operation of the switching field in controlling the particular state of the LCD, in accordance with one aspect of my invention, are best understood with reference to FIGS. 1–4. As shown in FIG. 2, each molecule in each layer of a chiral, smectic C material has a cone of possible orientations, with the axis A of the cone lying parallel to the major surfaces of the cell. This cone should not be confused with the cone of orientations associated with focal conic defect sites where the smectic layers themselves twist. In two of the illustrative states $S_3$ and $S_4$, the molecule does not lie in a plane parallel to the surfaces. There are, of course, an infinite number of other orientations which are similar to $S_3$ and $S_4$. In contrast, two of the orientations designated by states $S_1$ and $S_2$ correspond to the molecule lying in a plane 50 parallel to the cell surfaces. These two orientations are preferred and correspond to the stable states $S_1$ and $S_2$. In general, however, all orientations falling on the surface of the cone are possible and the display would have a correspondingly large number of possible states.

The "switching time" of the LC material is defined as the time for the LC molecules to switch from state $S_1$ to $S_2$, or conversely, and is primarily a function of electric field strength and cell temperature. In addition, it is also strongly dependent on cell thickness in thin cells but only weakly dependent in thick cells.

Figure 5:
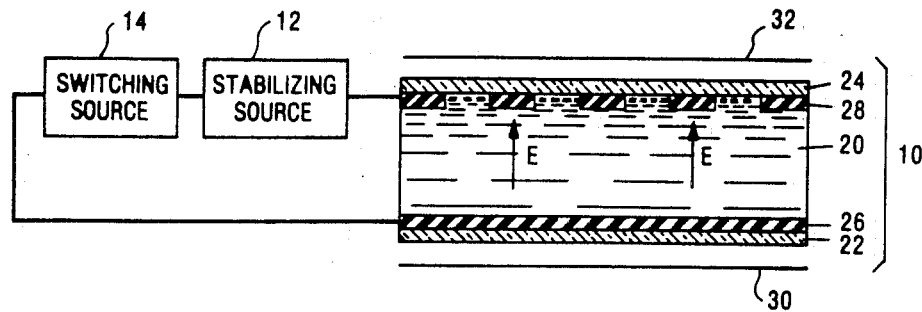
FIG. 5 is a schematic of a LCD in accordance with one embodiment of my invention depicting the switching and stabilizing sources connected to an illustrative cell.

In order to restrict the molecules to only two states $S_1$ and $S_2$, a stabilizing electric field $E_{st}$ is applied perpendicular to the cell surfaces as one component of the total field E shown in FIGS. 1 and 5. As a result, the molecules throughout the bulk of the LC material are confined to only two possible states. These states $S_1$ and $S_2$ are displaced from axis A by the smectic tilt angle $\phi$ thereto. In one state $S_1$ the ferroelectric fixed dipole moment $M_1$ is directed upwardly, whereas in the other state $S_2$, the fixed dipole moment $M_2$ is directed downwardly. In both cases M is perpendicular to the cell surfaces. The effect of the stabilizing field on the negative dielectric anisotropy of the LC material is independent of the sign of the field. Consequently, the stabilizing field acts to orient the molecules perpendicular to the field lines and thus restricts them to the two states $S_1$ and $S_2$ that are parallel to the cell surfaces. This effect acts throughout the bulk of the cell, thus producing stable states even in thick (i.e., $\geq 2$ $\mu$m) samples.

Figure 3:
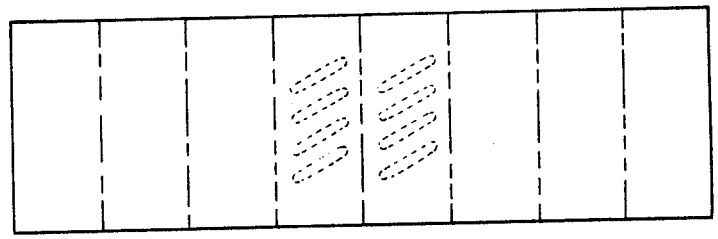
FIGS. 3 and 4 are top views of a layered ferroelectric, smectic C material showing the molecular orientation in the layers in the absence of pitch bands.
Figure 4:
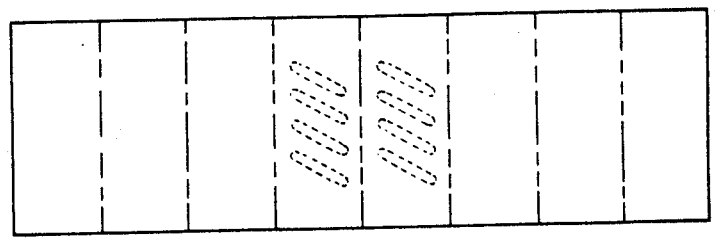

A top view of the molecular orientation in these states is shown in FIGS. 3 and 4. FIG. 3 shows molecules in separate layers oriented as in state $S_1$, whereas FIG. 4 depicts molecules in separate layers oriented as in state $S_2$. Of course, the particular pattern of orientations is controlled by the pattern of the electrodes as well as by the selection of which electrodes to energize.

Turning now to FIG. 5, there is shown schematically a LCD comprising a LC cell 10 to which a pair of voltage sources are connected, a stabilizing source 12 and a switching sources 14 in series with one another. Although shown as separate units, these sources can readily be designed as a single unit (e.g., integrated circuit). The switching source 14 generates one component of the electric field E, a switching electric field $E_{sw}$ which has a duration longer than or equal to the switching time of the LC material measured at the switching field strength. On the other hand, the stabilizing source 12 generates another component of the electric field E, a stabilizing electric field $E_{st}$ which has a half-cycle time substantially shorter than the switching time of the LC material measured at the combined switching and stabilizing field strengths. Except for marginal designs, however, it is adequate to relate the half-cycle time to the switching time at the stabilizing field strength alone. In addition, $E_{st}$ preferably has a substantially zero average value over the duration of the switching field.

The timing of the stabilizing and switching fields is largely dictated by the need to stabilize (latch) the states after switching them. For latching, the stabilizing field may be applied after the switching field provided the delay between the two is short relative to the relaxation time of the molecules. However, to enhance the threshold between states $S_1$ and $S_2$, the stabilizing field should be applied continuously during the display operation. A continuous stabilizing field is, of course, also suitable from the standpoint of latching. On the other hand, the shape of the voltage waveforms is not critical; for example, either field may be generated as a sinusoid or a square wave voltage of appropriate duration relative to the switching time of the LC material. The amplitude of the waveforms, on the other hand, is related to considerations such as switching speed (higher voltage stabilizing signals allow the use of shorter duration switching pulses) and threshold voltage (the peak switching signal voltage should exceed the threshold). The actual amplitude used in a particular case depends also on the negative dielectric anisotropy of the LC material and may be determined empirically from a suitable control sample.

The cell itself includes the LC material 20 bounded by confinement means, e.g., a pair of spaced, parallel, transparent plates 22 and 24. Illustratively, the plates comprise glass but plastic may also be suitable. The interior, facing major surfaces of the plates have conductive material patterned into electrodes 26 and 28 the shapes of which define the individual picture elements (pels) of the display. If light is to pass through either set of electrodes, then the material of that set should be transparent. In addition, the cell 10 has means for providing optical contrast, illustratively polarizes 30 and 32 on opposite sides thereof. In one arrangement suitable for thick cells, the polarizers are parallel to one another, but are oriented at the tilt angle $\phi$ with respect to the layers (i.e., axis A of FIG. 1). The thickness of the cell is chosen so that the orthogonal optical components experience a retardation of $n\lambda/2$, where $\lambda$ is the wavelength of the light and n is an odd integer. Depending upon the type of LC material, however, the polarizers may be omitted (e.g., in certain guest-host displays).

The LC material 20, in accordance with the invention, is ferroelectric and has a negative dielectric anisotropy. Illustratively, the LC material has a tilted, smectic phase including for example smectic phases C, F, G, I or J which are well known in the art. From the standpoint of switching speed, however, phase C smectic materials are much faster than the others and hence are to be preferred. LC materials containing a single chiral component as well as those containing a mixture of chiral components are suitable. One class of such materials constitutes the ferroelectric LC mixtures defined in my copending application, J. M. Geary et al. Ser. No. 727,572, supra, which is incorporated herein by reference. As noted earlier, these mixtures are formed from component chiral smectic C materials with opposing twist senses, and thus they have relatively long pitches. Examples of such LC mixtures include, without limitation, the following:

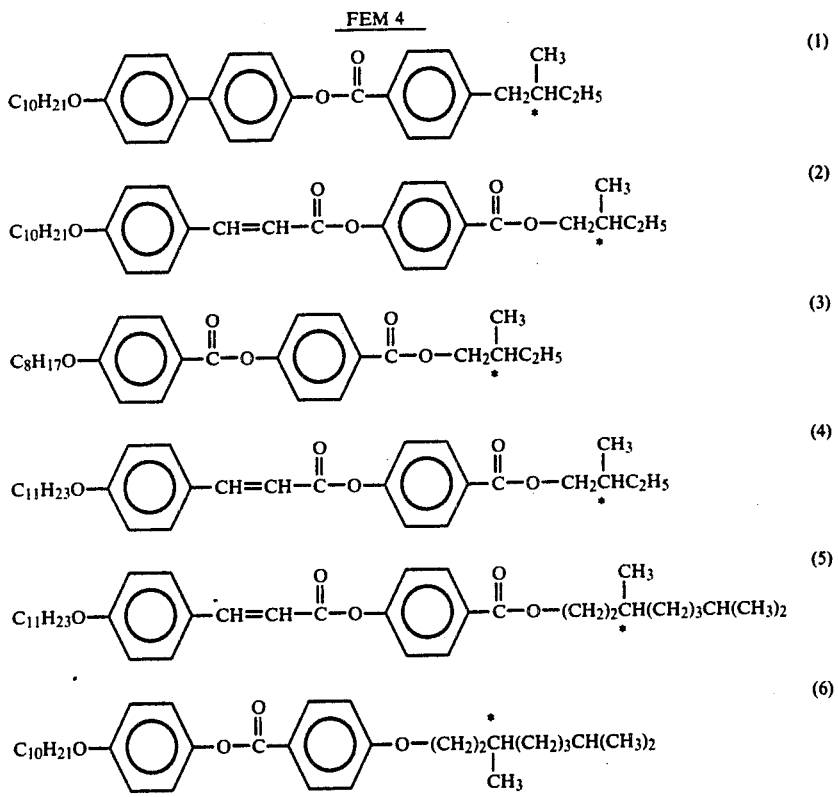

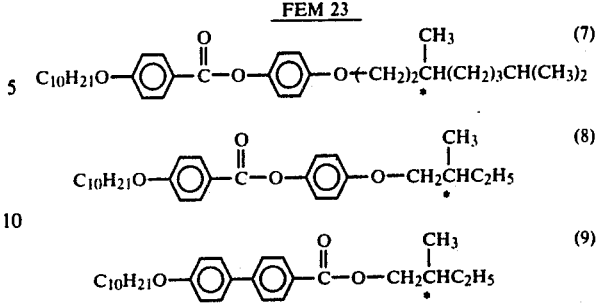

The constituents (1) through (6) were combined in the following weight percentages: (1) 20.5%, (2) 24.0%, (3) 17.8%, (4) 10.0%, (5) 19.7%, and (6) 8.0%. A total of about 1 gm of the mixture was weighed into a vial, heated to melting in the isotropic phase, agitated and then cooled to room temperature. The mixture was then ready for use. The FEM 4 mixture has a negative dielectric anistropy and exhibits the desired bistable characteristics in accordance with my invention but may not be optimum because the double bonds in constituents (2), (4) and (5) are sensitive to UV radiation. However, the FEM 23 mixture below also has a negative dielectric anisotropy (without UV sensitivity) and hence has exhibited similar bistable properties.

The constituents (7) through (9) were combined as above in the following weight percentages: (7) 59.3%, (8) 27.7% and (9) 13.0%, as described in my copending application, J. M. Geary Case Ser. No. 727,572, supra.

The asterisk in constituents (1) through (9) denotes the active chiral center.

The switching time of FEM 4 is about 3.0 msec at 1.2 V/$\mu$m in a 25 $\mu$m thick cell at 25° C. and that of FEM 23 is about 0.5 msec at 4.5 V/$\mu$m in a 5 $\mu$m thick cell at 23° C.

Although not shown in FIG. 5, in one embodiment the cell 10 is provided with alignment layers on the interior surfaces covering the electrodes and the transparent plates. Alignment techniques similar to those described by J. Patel et al, *Ferroelectrics*, Vol. 58–59, p. 457 (1984) can be utilized. These alignment techniques are also the subject matter of the copending application of J. W. Goodby et al Ser. No. 518,640 filed on July 29, 1983 and assigned to the assignee hereof. In addition, however, a preferred alignment technique is described in my concurrently filed application, J. M. Geary Ser. No. 727,575, supra, which is incorporated herein by reference. In accordance with one procedure taught therein, one interior surface of the cell is coated with an aligning layer (e.g., a crystalline polymer which is rubbed with a cloth, for example). The other interior surface is coated with a non-aligning layer (e.g., an amorphous polymer) that cannot align the LC material (even if rubbed) and is left unrubbed. For example, one interior surface may be coated with an aligning layer of rubbed polyethylene terephthalate (PET) whereas the other interior surface is coated with a non-aligning layer of unrubbed polymethylmethacrylate (PMMA).

Theory of Field-Stabilized States

Figure 6:
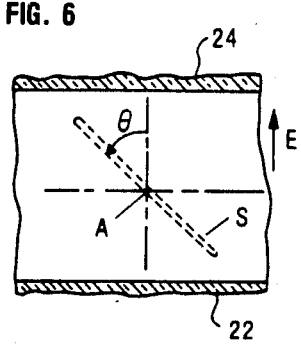
FIG. 6 shows the projection of a typical molecule onto a plane parallel to the smectic layers. The orientation of the molecule's projected image is given by the angle $\theta$.

The following derivation demonstrates how field-stabilized states are achieved in the bulk of a chiral, smectic C material. Similar comments apply to other tilted-phase, smectic materials. In FIG. 6 the smectic layers are aligned parallel to the plane of the paper, and the molecules are free to rotate around axis A normal to the paper. Although the molecule is in general oriented in three dimensions on the surface of a cone (FIG. 2), only the projection of the molecule onto the plane of the smectic layers is shown in FIG. 6.

An electric field E operates on both the ferroelectric fixed dipole as well as the induced dipole. Applying torque to the fixed dipole can cause switching and is related to pE, where p is magnitude of the dipole moment. On the other hand, applying torque to the induced dipole can produce field-stabilized states and, as shown below, is related to $\Delta\epsilon E^2$, where $\Delta\epsilon$ is the dielectric anisotropy. In accordance with my invention, the switching field $E_{sw}$ acts on the fixed dipole and has a duration longer than or equal to the characteristic switching time of the LC material at that field strength. To avoid well-known degradation of the LC material, $E_{sw}$ preferably has no DC component. In contrast, the stabilizing field $E_{st}$ acts on the induced dipole and has a hald-cycle time substantially shorter than the switching time of the LC material. $E_{st}$ has no DC component not only to avoid degradation but also to avoid spurious switching. That is, a DC component of $E_{st}$ would act on the fixed dipole and over time the integrated effect might be to cause the molecule to switch states.

To better understand these phenomena, let us proceed with the calculation, assuming, for purposes of the calculation only, that the stabilizing field takes the form of a sinusoid $E_{st}=E_p \sin \omega t$, where $E_{st}$ is applied parallel to the smectic layers and perpendicular to the cell surfaces.

To calculate the torque on the molecules around their axis A of permitted rotation, one needs to know the effective components of the dielectric constant normal to this axis. In most LC phases, there are only two dielectric constants, one parallel to the long molecular axis and one perpendicular to it. In the chiral smectic C state, however, there are in general three different dielectric constants as shown in FIG. 2: the usual parallel component $\epsilon_p$ and two perpendicular (normal) components $\epsilon_{n1}$ and $\epsilon_{n2}$, where $\epsilon_{n1}$ is defined to be parallel to the fixed dipole moment M, and $a_{n2}$ is defined to be perpendicular to the fixed dipole moment. Evaluating the effective components of these three dielectric constants in a plane normal to the axis A of permitted rotation, we obtain two projected components:

$$\epsilon_{proj(p)} = \epsilon_p \sin^2 \phi + \epsilon_{n2} \cos^2 \phi \quad (1)$$

$$\epsilon_{proj(n)} = \epsilon_{n1} \quad (2)$$

where $\phi$ is the smectic tilt angle. The trigonometric functions are squared because the tilt angle affects both the size of the induced moment and the component of electric field that acts on that moment. The projected dielectric anisotropy is now $$\Delta\epsilon_{proj} = \epsilon_{proj(p)} - \epsilon_{proj(n)}. \quad (3)$$

In rationalized MKS units, the torque (per unit volume) $\tau_{st}$ due to the time varying field $E_{st}$ is $$\tau_{st} = -\Delta\epsilon_{proj}\epsilon_0 E_{st}(t) \cos \theta][(E_{st}(t) \sin \theta)] \quad (4)$$

where $\epsilon_0$ is the permittivity of a vacuum, or $$\tau_{st} = -\frac{\Delta\epsilon_{proj}\epsilon_0}{2} E_{st}^2(t)\sin 2\theta, \quad (5)$$

where $\theta$ is the orientation of the projected molecule as shown in FIG. 6. For large $\omega$, $\tau_{st}$ is replaced with its time averaged value $\bar{\tau}_{st}$:

$$\bar{\tau}_{st} = -\frac{\Delta\epsilon_{proj}\epsilon_0}{4} E_p^2 \sin 2\theta. \quad (6)$$

This approximation is justified if the time for a half cycle of the stabilizing field is substantially smaller than the switching time of the LC material at a peak field of $E_p$. For a stabilizing field varying at this rate, the torque on the fixed ferroelectric dipole averages out to zero.

An effective potential $\Phi_{st}$ is defined as $$-\frac{d\phi_{st}}{d\phi} = \bar{\tau}_{st}, \quad (7)$$

and taking the derivative called for in equation (7) yields $$\phi_{st}(\theta) = -\frac{\Delta\epsilon_{proj}\epsilon_0}{8} E_p^2 \cos 2\theta. \quad (8)$$

Figure 7:
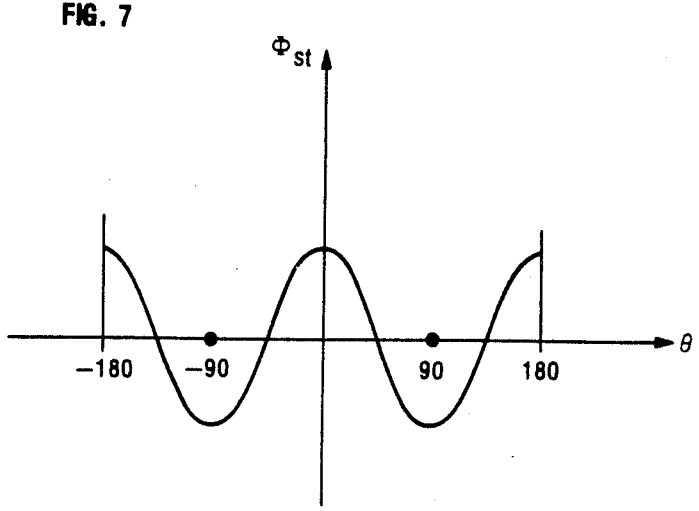
FIG. 7 is a graph of calculated potential $\phi$ as a function of $\theta$.

This effective potential is plotted in FIG. 7. Because of its $2\theta$ dependence, $\Phi_{st}$ exhibits a double potential well with two stable states in each full cycle of $\theta$. The nature of these states depends on the sign of $\Delta\epsilon_{proj}$. If the dielectric anisotropy $\Delta\epsilon_{proj}$ is negative (as it is in FIG. 6), then the stable states are at $\theta = \pm 90°$. Thus, the molecules will lie perpendicular to the applied field and parallel to the surfaces of the cell. If $\Delta\epsilon_{proj}$ is positive, then the states are at $\theta = 0°$ and $\theta = 180°$, so that the projected director is parallel to the field lines.

The two permitted molecular configurations in the case of negative $\Delta\epsilon_{proj}$ are similar to the two states of Clark et al, supra. But, in accordance with my invention, the states are induced by a stabilizing field acting throughout the bulk of the LC material, rather than by a short range surface interaction. Consequently, my display cell can be made much thicker than the 1 $\mu$m spacing typical of the Clark et al display. The double potential well form of the potential energy diagram of FIG. 7 indicates that the stabilizing field will encourage latching even in thick cells and, importantly, the double well implies a threshold between these two states.

Observation of Field-Stabilized States

Field-stabilized states corresponding to the negative $\Delta\epsilon_{proj}$ case have been observed in several ferroelectric LC materials such as FEM 23 described earlier and disclosed in my copending application, J. M. Geary et al Case Ser. No. 727,572, supra. Another LC material which exhibits these states very clearly is a long pitch mixture identified earlier as FEM 4. The following experiments were performed using FEM 4 cells.

For purposes of experimentation, a wedge cell having a thickness which varied from 5 μm at the left to 7 μm at the right was filled with FEM 4. With 40 V applied across the cell at about 25° C., the switching time ranges from about 0.45 msec to 0.63 msec. At 80 V, however, the switching time would be halved approximately. The smectic layers are aligned parallel to the vertical diagonal of a square electrode, and the sample was somewhat rotated with regard to crossed polarizer axes. Alignment was obtained by a technique in which one surface was coated with polyethelene terephthalate (PET) and rubbed, and the other surface was coated with polymethylmethacrylate (PMMA) and was left unrubbed as described in my concurrently filed application, J. M. Geary Ser. No. 727,573, supra. When no field was applied, two complex domain states were faintly visible. These states, which are typical of unwound thick ferroelectric samples, exhibited a variation of molecular orientation from one surface of the cell to the other. They did not show extinction at any orientation. But, when a sinusoidally varying stabilizing field was applied (40 V peak, 15 kHz, 33 μsec half-cycle time), these states straightened out into simple homogeneous domains with good extinction. The symmetry of the two states was demonstrated by rotating the sample to either side of the polarizer axis.

The field-stabilized states in the above FEM 4 sample could be switched and exhibited latching after the switching pulse was over. Switching source 14 (FIG. 5) generated bipolar pulses (i.e., two contiguous rectangular pulses of equal (1.5 msec) duration and magnitude, but of opposite sign) which were superimposed on the sinusoid generated by stabilizing source 12. Pulses of this form, which are useful in practical display addressing schemes, actually switch the LC material twice, leaving it in the field-stabilized state corresponding to the trailing polarity. In one experiment, latched light and dark conditions of the display were produced by bipolar pulses of two different senses (positive pulses followed by negative, and negative pulse followed by positive). The switching pulse magnitude was 40 V and the entire bipolar pulse lasted 3 msec.

In order to matrix address or multiplex a display, a single addressing pulse of a particular amplitude completely switches a display element, while numerous smaller disturb pulses (the byproduct of addressing other elements of the display) should not significantly switch the element. Clearly, a sharp switching threshold is desirable for effective multiplexing.

Accordingly, field-stabilized states in a FEM 4 cell with a 5 μm spacing were tested for threshold behavior. Results were obtained for large (40 V peak) and small (20 V peak) sinusoidal stabilizing fields, both at a frequency of 5 kHz (100 μsec half-cycle time). As before, the switching time at 40 V and 25° C. is about 0.45 msec, but is about 0.90 msec at 20 V. The effects of (a) single bipolar write pulses, and (b) sequences of 1000 bipolar disturb pulses were studied as a function of pulse amplitude. The write and disturb pulses were of the same form, corresponding to a simple 2:1 address scheme. Light transmission was measured with the sample placed between crossed polarizers. The sample was rotated to one side (as in the previous experiment) to produce a contrast between the two field-stabilized states. The sample was first put in the state of minimum light transmission by a single 40 V bipolar reset pulse, and then signals of type (a) or (b) were applied. The resulting increase in light transmission is plotted versus pulse magnitude in FIG. 8.

The data for the 40 V sinusoid amplitude revealed an extremely sharp switching threshold. The write response (curve I) went from virtually zero to close to the maximum for only a 1 V increase in switching pulses magnitude from 17 V to 18 V. More importantly, however, the disturb response (curve II) was equally steep and was very close to the write curve. Under these circumstances, a 1000 element display can be easily multiplexed. With the smaller 20 V sinusoid amplitude, the write response (curve III) was still reasonably sharp, but the disturb response (curve IV) was broadened and displaced to lower voltages. The less desirable performance at 20 V is attributable to the fact that decreasing the peak amplitude by a factor of two reduces the torque on the molecules by a factor of four [see equation (6)]. Still, one is just able to bracket the write and disturb curves within a factor of two (16 V and 32 V), so that 1000:1 multiplexing is still possible, even with the lower amplitude sinusoid.

Figure 8:
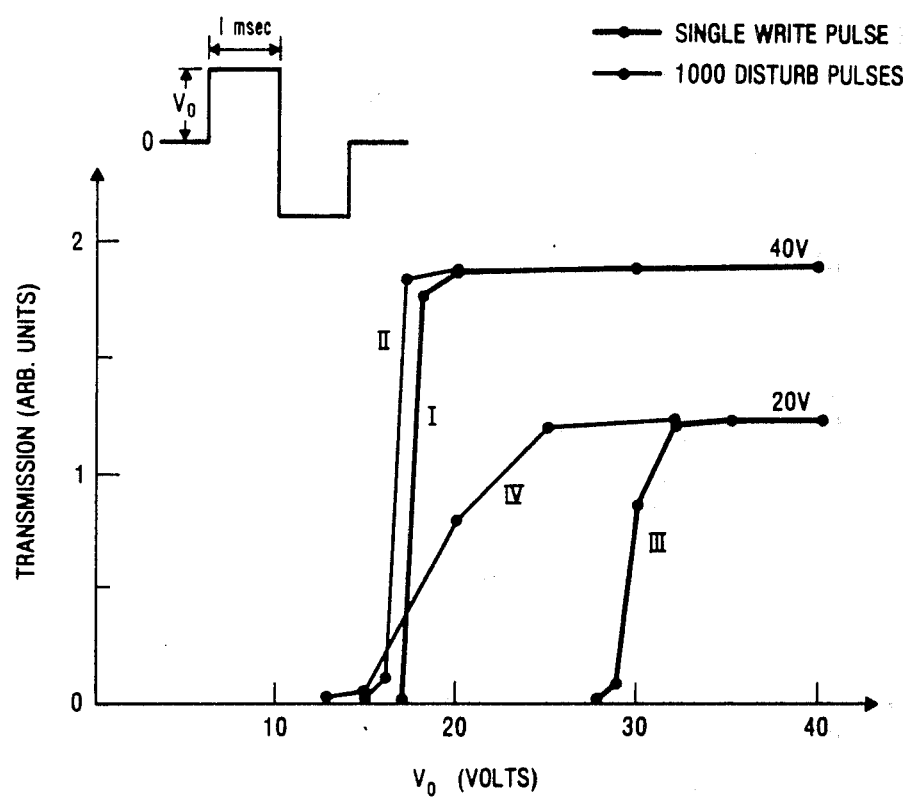
FIG. 8 is a graph of threshold curves for single bipolar write pulses and groups of 1000 bipolar disturb pulses. Change in transmission (in arbitrary units) is plotted as a function of pulse magnitude $V_o$. Curves are shown for a superimposed AC signal of 40 V and 20 V amplitudes.

The threshold behavior exhibited in FIG. 8, especially for the larger sinusoid amplitude, seems to confirm the predictions of the calculations performed earlier. However, the observed behavior does not fully correspond to the simple threshold concept illustrated by the potential well drawing of FIG. 7. Whereas the above FEM 4 sample exhibited good threshold for pulse switching signals, it was possible to switch the cell's state at almost any amplitude if the switching signal was applied as sustained DC. In a practical LCD, however, DC is generally avoided to prevent degradation of the LC material. Hence, what is seen is not a static threshold, but rather a dynamic threshold, dependent on the brief duration of the applied switching pulses. When sustained DC was used, switching was observed to occur by the motion of domain walls which nucleate on defects and propagate across the sample. The simple potential well model of FIG. 7 clearly cannot anticipate such effects since it presumes a completely uniform material where no defects exist and where domain walls, being boundaries between regions of differing molecular orientation, cannot be present. Evidently the switching caused by brief, relatively high amplitude pulses results in something closer to bulk switching, where the model of FIG. 7 is more appropriate. It is important to note, however, that a static threshold is not necessary for the multiplexing of displays, where brief switching pulses are desirable to begin with.

An interesting feature of the data of FIG. 8 is the implication of increased switching speed in the case of the higher amplitude (40 V) sinusoid. The pulse amplitude $V_o$ required to write was reduced by nearly a factor of two by increasing the sinusoid amplitude from 20 V to 40 V, which implies an increase in the write speed if the write pulse voltage were kept fixed as the sinusoid amplitude was increased. The reasons for this effect are not well understood at present.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, while special emphasis was placed on the utility of my invention for thick ($\lesssim 2$ μm) cells, other attributes of field-stabilized states may be useful in thin (<2 μm) cells as well.

What is claimed is:

1. A liquid crystal device comprising:
   a liquid crystal cell containing a ferroelectric liquid crystal material having a characteristic switching time, and
   means for applying an electric field to said material, CHARACTERIZED IN THAT said applying means includes, in combination,
   means for applying a stabilizing electric field which has a half-cycle time shorter than the switching time of said material, and
   means for applying a switching electric field which has a duration longer than or equal to the switching time of said material.

2. The device of claim 1 wherein said applying means generates said stabilizing field with a substantially zero average value over the duration of said switching field.

3. The device of claim 1 wherein
   said cell includes a pair of parallel, spaced, major surfaces which bound said material,
   said material comprises a layered, smectic, tilted phase liquid crystal, said layers being oriented perpendicular to said surfaces,
   said stabilizing field causes the molecules in said layers to lie in planes parallel to said surfaces, each molecule in each plane having a pair of stable states, and
   said switching field causes said molecules to switch between said states.

4. The device of claim 1, 2 or 3 wherein said ferroelectric liquid crystal comprises a chiral smectic C phase liquid crystal.

5. The device of claim 1, 2 or 3 wherein said ferroelectric liquid crystal material comprises a mixture of liquid crystal components containing chiral liquid crystal material.

6. The device of claim 5 wherein said components have opposing twist senses resulting in a relatively long pitch.

7. The device of claim 3 further including an aligning layer on one of said cell surfaces and a nonaligning layer on the other of said cell surfaces, said aligning layer comprising a crystalline polymer which produces alignment of the liquid crystal molecules along a predetermined direction, and said non-aligning layer comprising an amorphous polymer which does not produce such alignment.

8. The device of claim 7 wherein said crystalline polymer comprises PET and said amorphous polymer comprises PMMA.

9. The device of claim 1, 2, 3, 7 or 8 wherein the thickness of said cell is greater than about 2 μm.

10. The device of claim 1, 2, 3, 7 or 8 wherein said electric fields are applied essentially perpendicular to said major surfaces of said cell.

11. The device of claim 1, 2, 3, 7 or 8 wherein said applying means applies said stabilizing field and said switching field during time intervals which are separated by a time less than the relaxation time of said liquid crystal material.

12. The device of claim 1, 2, 3, 7 or 8 wherein said applying means applies said stabilizing field essentially continuously during the operation of said display.

13. A liquid crystal display comprising
    a liquid crystal cell containing a ferroelectric liquid crystal material which has a characteristic switching time, said cell including a pair of parallel, spaced, transparent plates which bound said material, electrodes formed on the interior major surfaces of each of said plates, an aligning layer formed on one of said major surfaces and said electrode thereon, and a non-aligning layer formed on another of said major surfaces and said electrodes thereon,
    means coupled to said electrodes for applying an electric field to said material in a direction perpendicular to said surfaces,
    said applying means including, in combination,
       means for applying a switching electric field pulse which has a duration longer than or equal to the switching time of said material, and
       means for applying a stabilizing electric field which has a substantially zero average value and which has a half-cycle time shorter than the switching time of said material,
    said material comprising a chiral, smectic, tilted phase liquid crystal formed in layers which are oriented perpendicular to said surfaces,
    said stabilizing field causing the molecules in said layers to lie in planes parallel to said major surfaces, each molecule in each plane having a pair of stable states,
    said switching field causing said molecules to switch between said states, and
    said aligning layer comprising a crystalline polymer which produces alignment of said molecules along said direction, and said non-aligning layer comprises an amorphous polymer which produces no such alignment.

14. The display of claim 13 wherein said liquid crystal material comprises a chiral, smectic C phase liquid crystal.

15. The display of claim 13 wherein said liquid crystal material comprises a mixture of liquid crystal components each of which is a chiral liquid crystal but of opposing twist senses.

16. The display of claim 13, 14 or 15 wherein the thickness of said cell is greater than about 2 μm.

17. The display of claim 13, 14 or 15 wherein said applying means applies said stabilizing field and said switching field during time intervals which are separated by a time less than the relaxation time of said liquid crystal material.

18. The display of claim 13, 14 or 15 wherein said applying means applies said stabilizing field essentially continuously during the operation of said display.

* * * * *